A. J. LEWIS.
MACHINE FOR MAKING HAIRPINS.
APPLICATION FILED JULY 12, 1919.
1,360,234.
Patented Nov. 23, 1920.
8 SHEETS—SHEET 4.
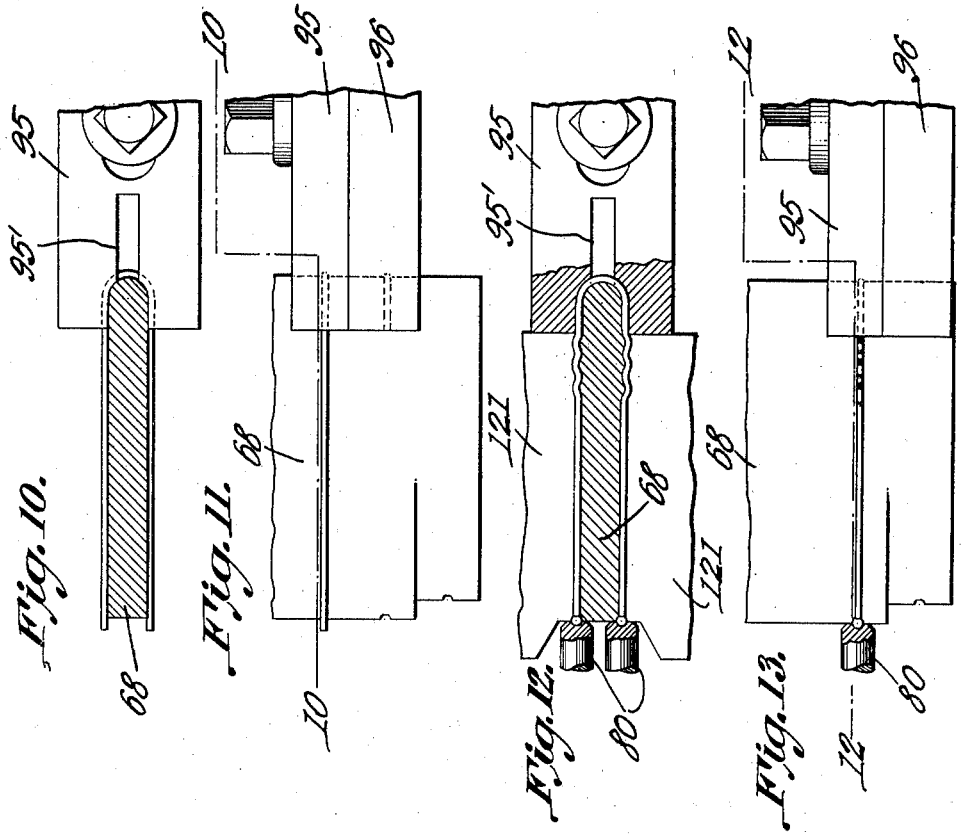
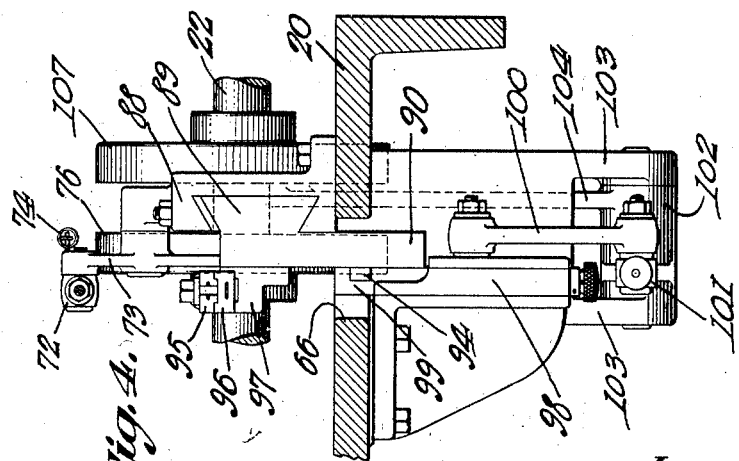
Inventor
Arthur J. Lewis
By Norman T. Whitaker
His attorney

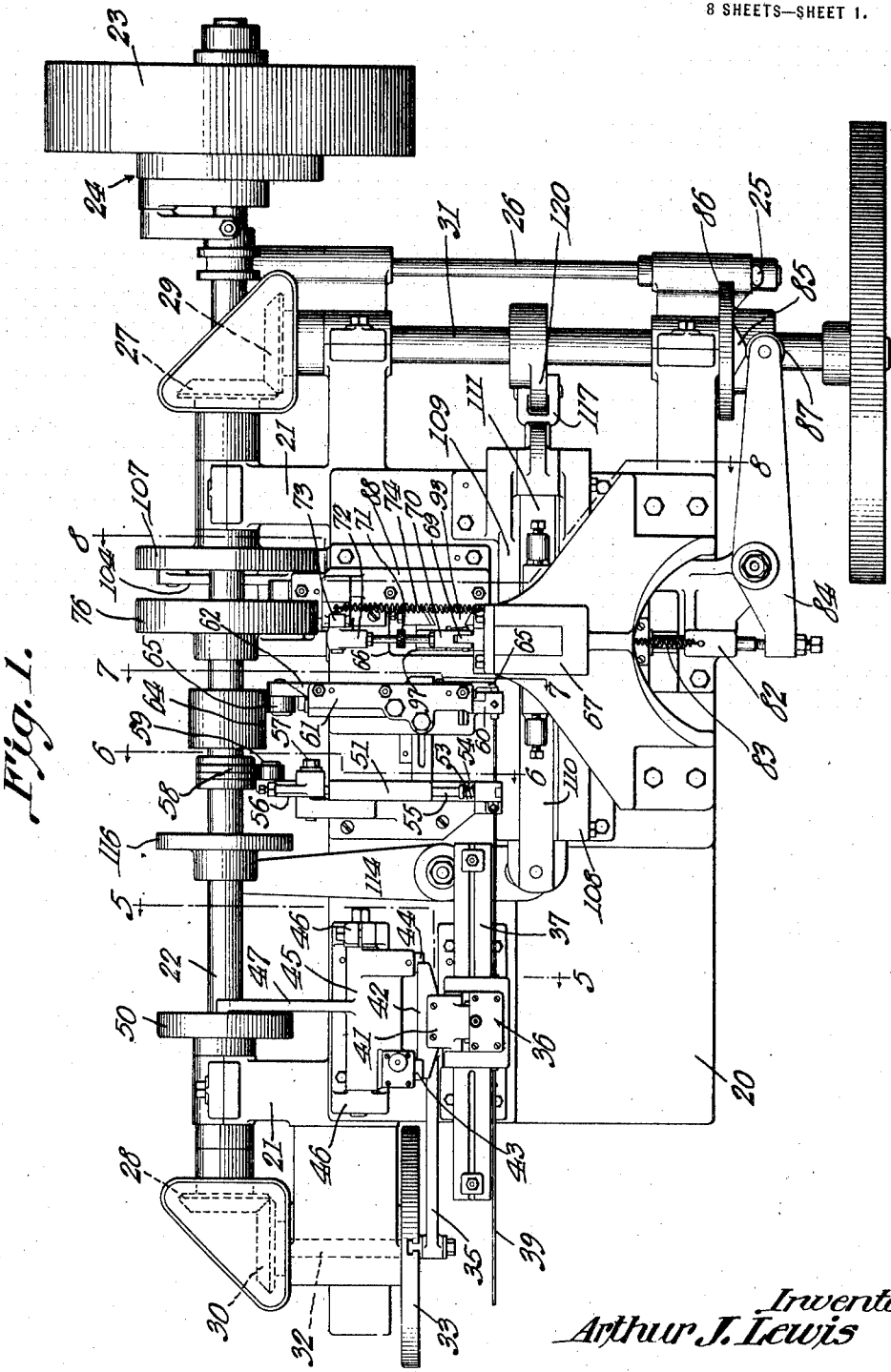

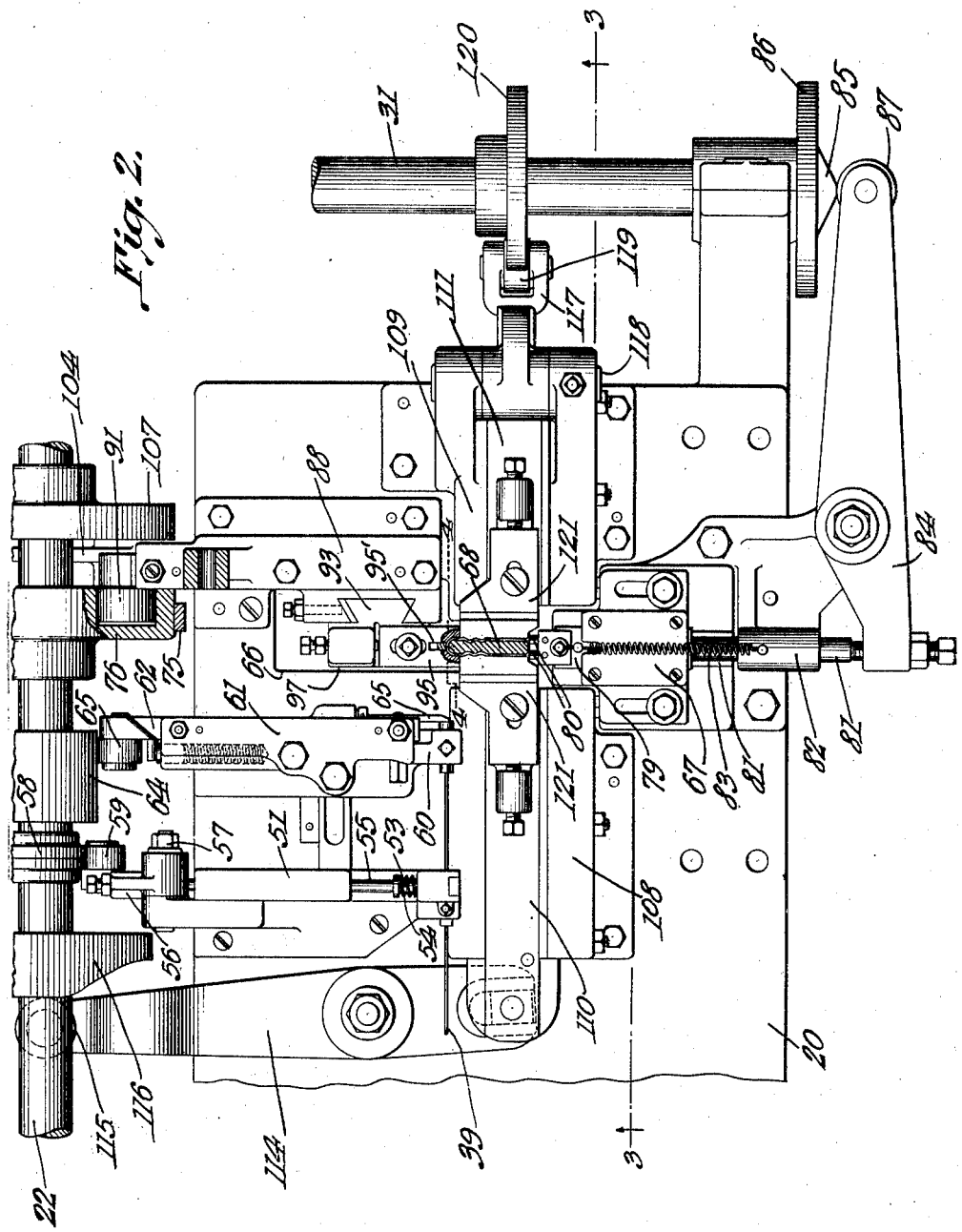

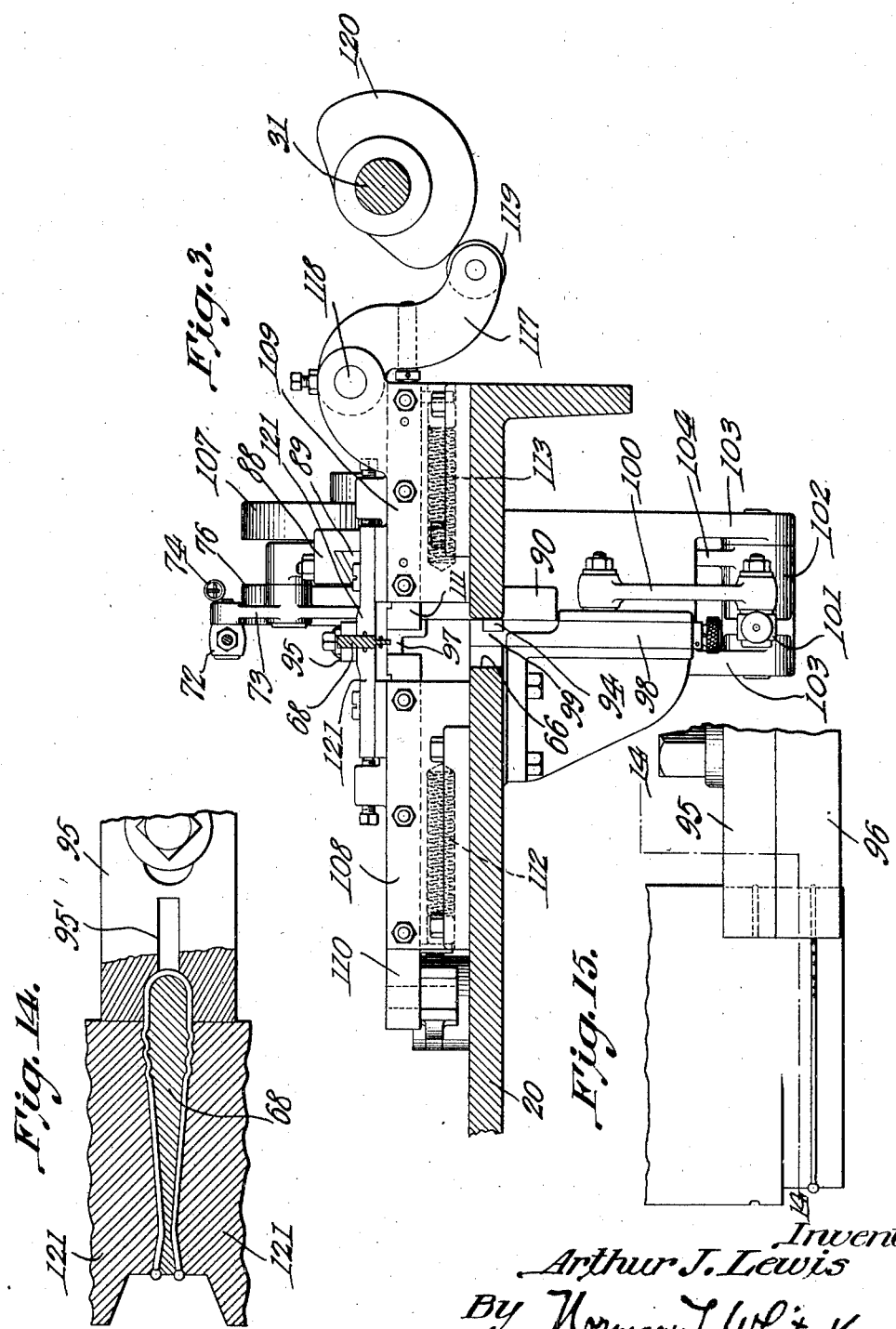

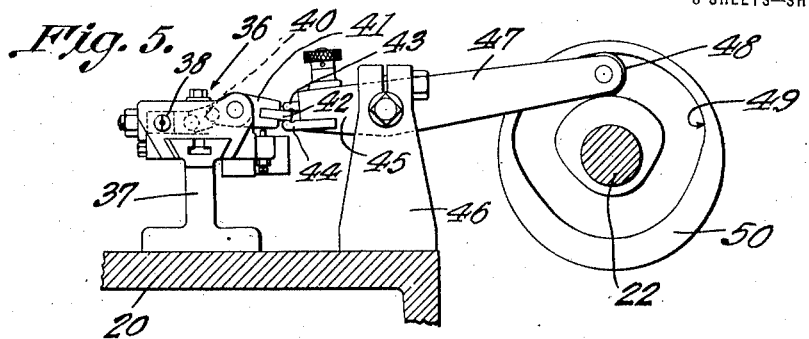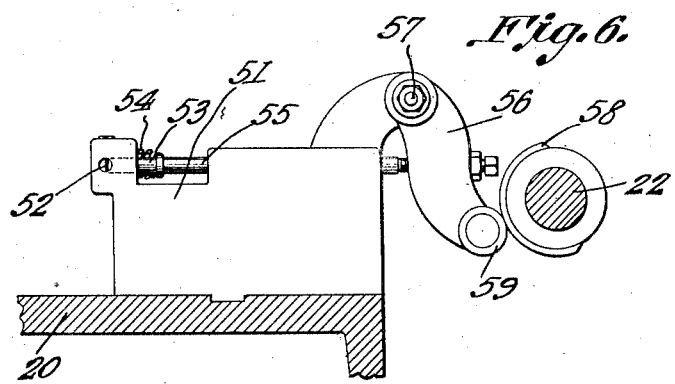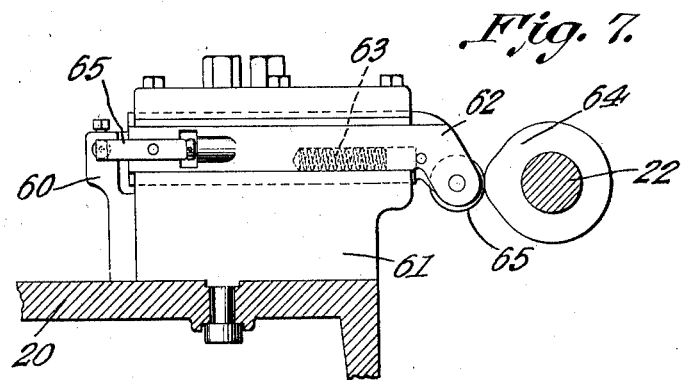

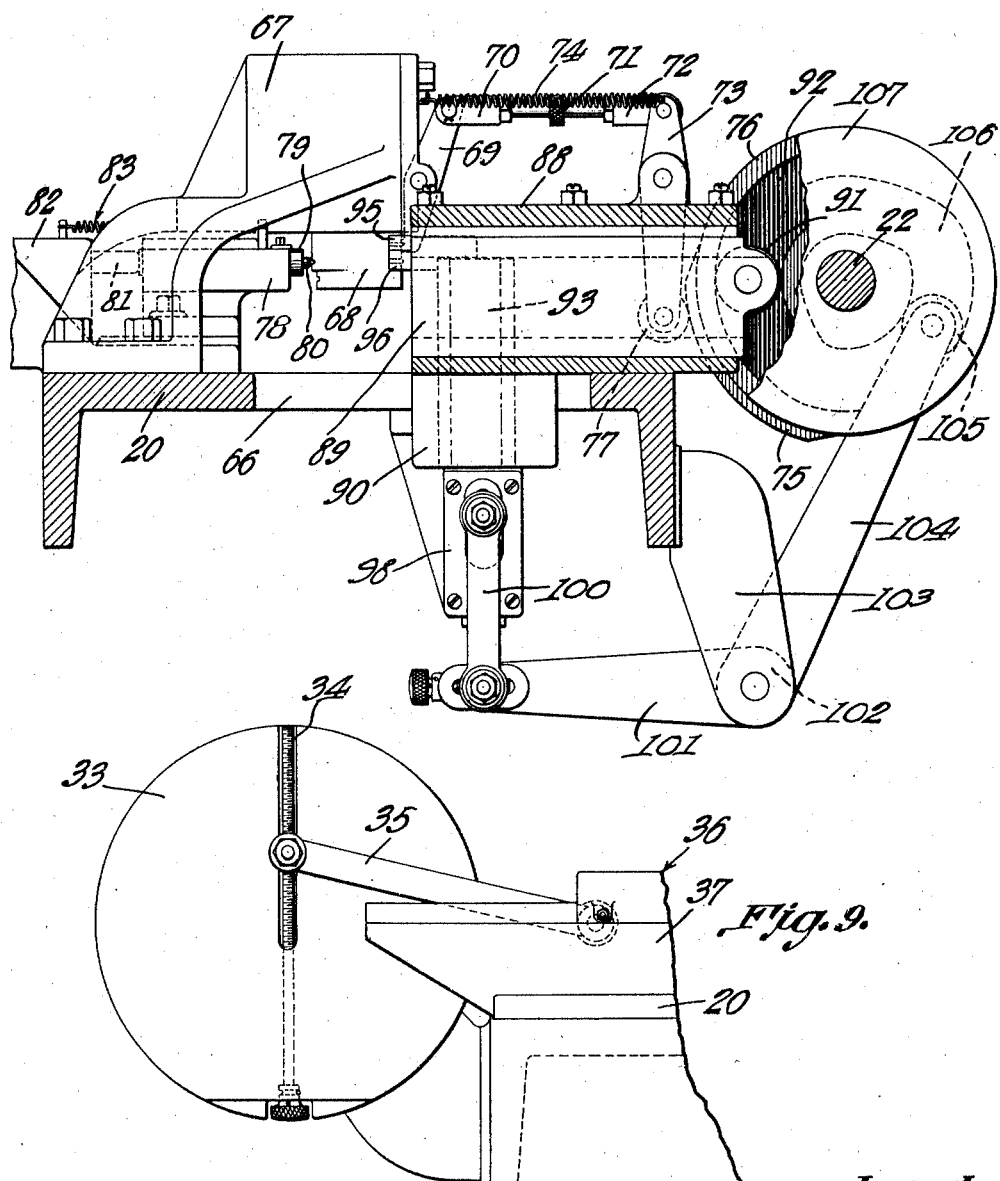

A. J. LEWIS.
MACHINE FOR MAKING HAIRPINS.
APPLICATION FILED JULY 12, 1919.
1,360,234.
Patented Nov. 23, 1920.
8 SHEETS—SHEET 7.
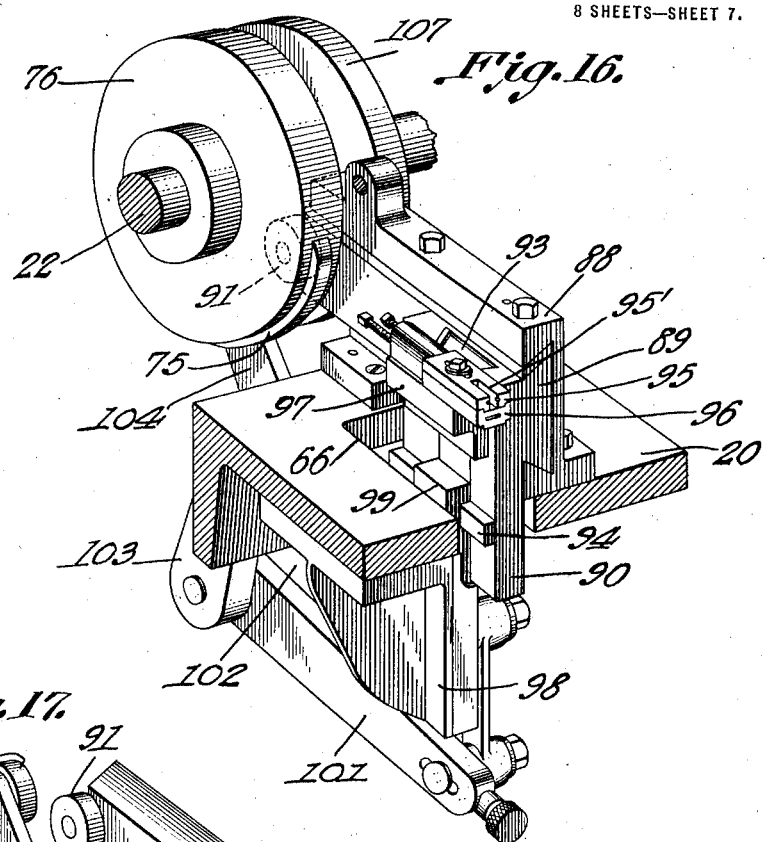
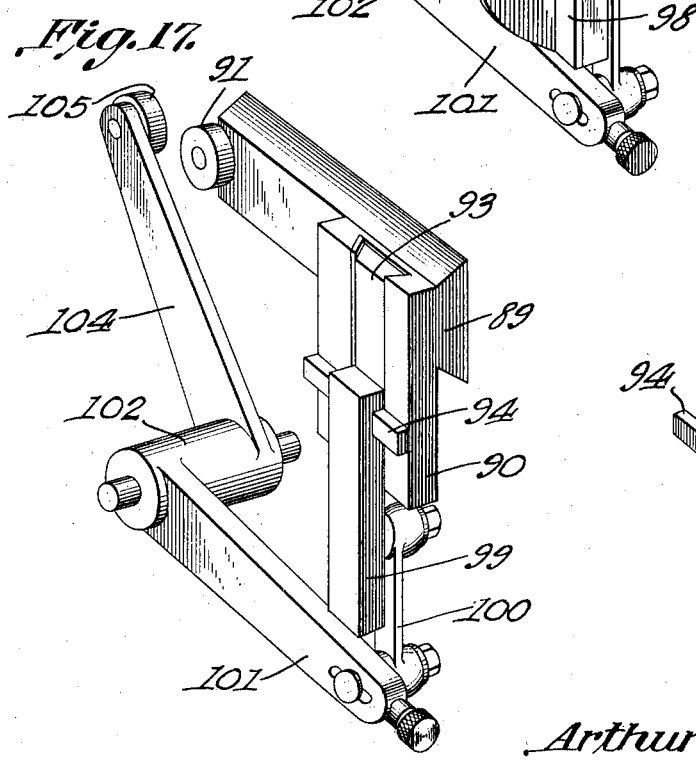
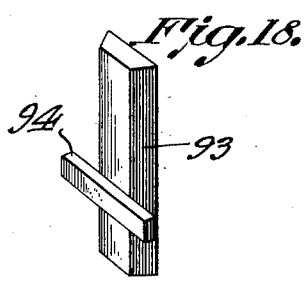
Inventor
Arthur J. Lewis
By Norman T. Whitaker
His attorney

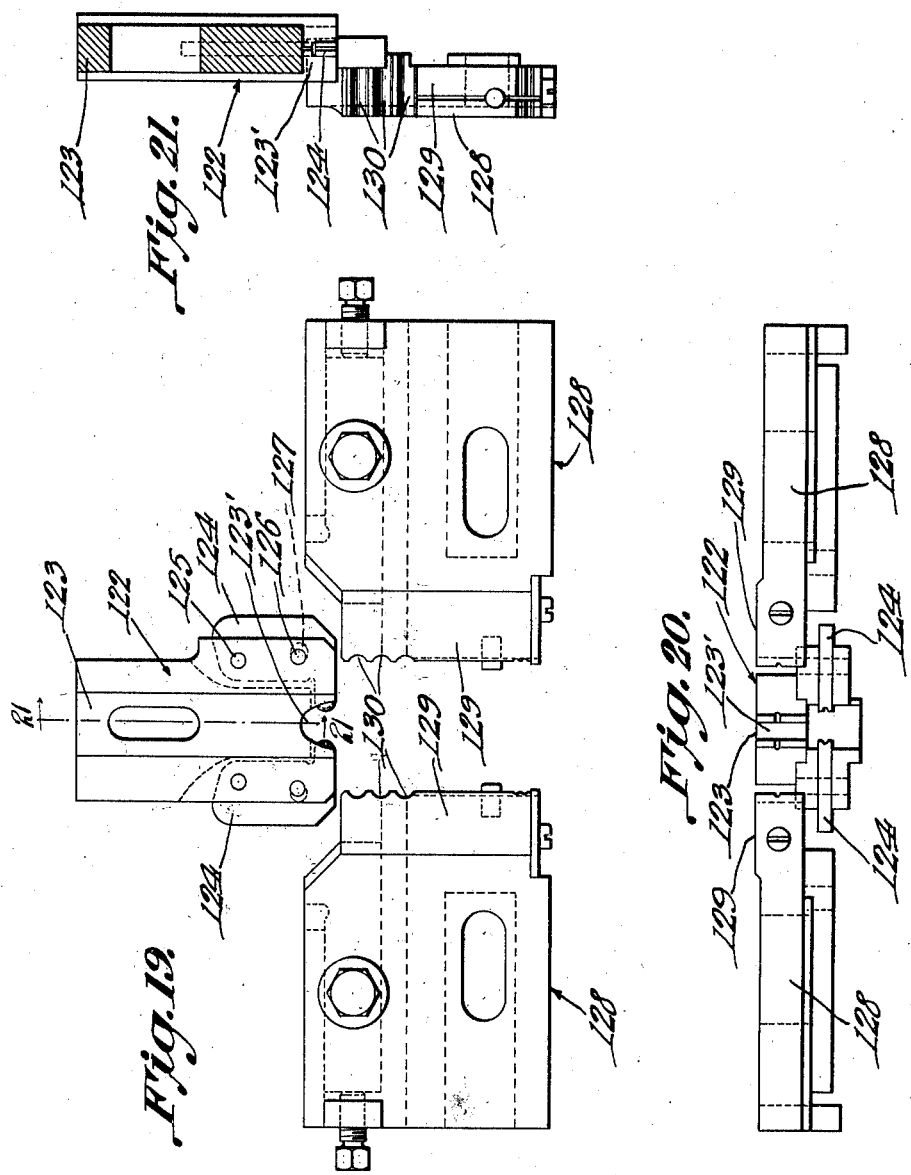

UNITED STATES PATENT OFFICE.

ARTHUR J. LEWIS, OF STRATFORD, CONNECTICUT, ASSIGNOR TO STA-RITE HAIR PIN COMPANY, OF GALESBURG, ILLINOIS, A CORPORATION OF DELAWARE.

MACHINE FOR MAKING HAIRPINS.

1,360,234.  Specification of Letters Patent.  Patented Nov. 23, 1920.

Application filed July 12, 1919. Serial No. 310,477.

*To all whom it may concern:*

Be it known that I, ARTHUR J. LEWIS, a citizen of the United States, and a resident of Stratford, in the county of Fairfield and State of Connecticut, have invented new and useful Improvements in Machines for Making Hairpins, of which the following is a specification.

This invention relates to hair pin making machines and has particular reference to that class of machines adapted to the manufacture of hair pins shown, described and claimed in the United States Patent No. 1,233,195 of July 10, 1917 to S. E. Creech and Perry Bland.

An important object of the invention is to provide in a hair pin machine a means whereby the successive operations necessary to the formation of the hair pin may be carried out with the greatest possible degree of accuracy and at the greatest possible speed without injury to the machine as a whole or the several operable coöperative elements thereof.

A further object of the invention is to provide in a machine of the above mentioned character a means whereby a given length of wire may be accurately carried successively from one position to another to undergo the successive bending operations necessary to the formation of the complete hair pin.

A further object of the invention is to provide in a machine of the above mentioned character a means whereby the finished hair pin may be effectively ejected from the machine to prevent any possibility of impairing the operation of the several coöperating elements during their successive operations upon a given length of wire to form the hair pin.

Other objects and advantages of the invention will be apparent during the course of the following description taken in connection with the accompanying drawings.

In the drawings, forming a part of this specification and wherein like numerals are employed to designate like parts throughout the same, Figure 1 is a top plan view of the machine embodying my invention, Fig. 2 is a fragmental top plan view of the machine, certain elements thereof being shown in detail and in section, Fig. 3 is a vertical sectional view taken substantially on line 3—3 of Fig. 2, Fig. 4 is an enlarged detail sectional view taken substantially on line 4—4 of Fig. 2, Fig. 5 is an enlarged detail sectional view taken substantially on line 5—5 of Fig. 1, Fig. 6 is an enlarged detail sectional view taken substantially on line 6—6 of Fig. 1, Fig. 7 is an enlarged detail sectional view taken on line 7—7 of Fig. 1, Fig. 8 is an enlarged detail sectional view taken on line 8—8 of Fig. 1, Fig. 9 is a front elevation of a disk and an adjustable pitman, Fig. 10 is a sectional view of a mandrel showing a given length of wire as having undergone the first bending step in the formation of the pin, the section being taken substantially on line 10—10 of Fig. 11, Fig. 11 is a side elevation of a mandrel showing a given length of wire in the same position with respect to the mandrel as shown in Fig. 10, Fig. 12 is a sectional view of a mandrel showing a given length of wire as having undergone the second bending step and the upsetting of the ends of the wire, the section being taken substantially on line 12—12 of Fig. 13.

Fig. 13 is a side elevation of a mandrel showing a given length of wire in the same position with respect to the mandrel as shown in Fig. 12, Fig. 14 is a sectional view of a mandrel showing a given length of wire as having undergone the third bending step subsequent to the upsetting of the ends thereof, the section being taken substantially on line 14—14 of Fig. 15, Fig. 15 is a side elevation of a mandrel showing a given length of wire in the same position with respect to the mandrel as shown in Fig. 14, Fig. 16 is a perspective view of a die operating mechanism, Fig. 17 is a perspective view of certain vertical and horizontally movable elements of the mechanism shown in Fig. 16, Fig. 18 is a perspective view of a vertically movable element shown in Fig. 17, Fig. 19 is a top plan view of a preferred form of wire bending element and of a pair of jaws, Fig. 20 is an edge elevation of the elements shown in Fig. 19, and, Fig. 21 is a longitudinal sectional view taken on line 21—21 of Fig. 19.

In the drawings, wherein for the purpose of illustration is shown a preferred form of my invention, the numeral 20 indicates a base, suitably supported upon legs not shown, the base 20 being provided with arms 21 to which is suitably journaled a shaft 22 having secured at its end a power pulley 23 adapted for connection with any approved type of prime mover not shown. The machine as a whole is adapted to be thrown into and out of gear by means of a suitable clutch carried by the pulley, which clutch is indicated as a whole by the numeral 24 and manually operated by means of a hand lever 25 suitably secured to a clutch operating shaft 26. To the shaft 22 there is secured bevel gears as shown at 27 and 28, the bevel gears meshing respectively with coöperating gears 29 and 30, the gears 29 and 30 being carried by shafts 31 and 32 which are suitably journaled to the base 20 to permit free rotation thereof. To the shaft 32 there is secured a disk 33 which carries a screw-threaded rod 34 to which is pivotally connected a pitman 35, the pitman at its point of connection with the rod 34 being adapted to adjustment to vary the eccentricity thereof. The pitman 35 is pivotally connected to a reciprocating wire feeding mechanism which is indicated as a whole by the numeral 36 and slidably mounted upon a suitable support as shown at 37. The wire feeding mechanism employs a wire gripping element as shown at 38, which wire gripping element is adapted to be moved into and out of engagement with a strand of wire as shown at 39 by means of toggle joints 40 which are connected to an oscillating member 41. The oscillating member is provided with a wing 42 adapted to be engaged alternately by lugs 43 and 44 carried by an oscillating member 45 pivoted to suitable brackets 46. The oscillating member 45 carries an elongated arm 47 provided at its end with a roller 48 adapted to follow an eccentric groove 49 of a disk 50 which is secured to the shaft 22.

To the base 20 there is secured a guide 51 which is provided with an opening 52 through which the wire is adapted to pass. Within the guide 51 there is slidably mounted a wire retaining plunger 53 which is urged in one direction by means of a coil spring 54 and in the opposite direction by means of a reciprocating rod 55 which in turn is operated by means of an oscillating arm 56 pivotally connected to an extension of the guide 51 as shown at 57, the arm 56 being actuated by means of a cam 58 carried by the shaft 22 and adapted to engage a roller 59 as clearly shown.

To the base 20 there is connected a second wire guiding element 60 in proximity to which is mounted a shear retaining block 61 having a slidable bar 62 arranged therein which is urged in one direction by an inclosed coil spring 63 and in an opposite direction by means of a cam 64 carried by the shaft 22 and adapted to engage a roller 65 suitably journaled to the bar 62 as shown. The bar 62 at its other end is provided with an adjustable cutting element 65 adapted to coöperate with the guiding element 60 in order to cut the strand of wire 39 into predetermined lengths, which lengths may be varied by means of the adjustment screw 34 as will be apparent when considering the hereinafter described operation of the machine.

The base 20, relatively near an opening 66 therein, is provided with a mandrel retaining element 67 to which there is secured a depending mandrel 68 which on section lines 10—10, 12—12 and 14—14 has a contour as shown respectively in Figs. 10, 12 and 14. To the mandrel retaining element 67 there is pivotally connected an arm 69, one end of which is adapted to engage the mandrel substantially on section line 10—10 of Fig. 11 for retaining a given length of wire in position immediately prior to the first bending operation thereof as will be more readily understood when considering the hereinafter described operation of the machine. To the upper end of the arm 69 there is pivotally connected a second arm 70 which in turn is linked by means of a turn buckle 71 to a similar arm 72, the latter arm being pivotally connected to an oscillating lever 73 which is urged in one direction by means of a coil spring 74 and in an opposite direction by means of a cam 75 carried by a disk 76, the cam being adapted to engage a roller 77 suitably connected to the lower end of the oscillating lever 73.

Upon the base 20 there is mounted a guide block 78 carrying a reciprocating block 79 which is provided with a pair of upsetting heads 80. The block 79 is adapted to engage a plunger 81 slidably mounted in a housing 82 and is urged in one direction by means of a coil spring 83 and in an opposite direction by means of an oscillating lever 84 which is operated by means of a cam 85 carried by a disk 86, the cam 85 being adapted to engage a roller 87 suitably secured to the end of the oscillating lever 84.

In proximity to the opening 66 there is arranged a housing 88 having a longitudinally movable block 89 mounted therein, which block is provided with a depending guide 90 and adapted to be reciprocated within the housing 88 by means of a roller 91 arranged within an eccentric groove 92 of the disk 76. Within the depending guide 90 there is mounted a vertically movable block 93 which carries substantially intermediate its ends a bead 94 and at its upper end a wire bending element 95 which is superimposed upon a transferring element 96, the wire bending element 95 and the transferring element 96 both being secured to a flange 97 carried by the vertically movable block 93. The wire bending element 95 is provided, as clearly shown in Fig. 16, with a slot 95' adapted to receive the lower end of the arm 69 when in the position shown in Fig. 8. To the under side of the base 20 there is secured a housing 98 within which is mounted a vertically movable plunger 99 having its upper end recessed to receive the bead 94 and its lower end pivotally connected to a link 100. The link 100 is pivotally connected to an arm 101 carried by a hub 102 which is journaled within depending brackets 103 supported by the base 20. To the hub 102 there is connected a second arm 104 which at its end is provided with a roller 105 adapted to operate within an eccentric groove 106 of a disk 107 which is secured to the shaft 22 and corresponds to the disk 76 hereinbefore described.

Upon the base 20 there is imposed and suitably secured thereto a pair of guides shown at 108 and 109 within which reciprocating blocks 110 and 111 are respectively mounted, the blocks being urged outwardly by means of inclosed coil springs 112 and 113 carried respectively within the guides 108 and 109. The block 110 is moved against the influence of spring 112 by means of a rocking arm 114 suitably connected at one end to the block 110 and provided at its opposite end with a roller 115 adapted to coact with a cam wheel 116 suitably secured to the shaft 22. The block 111 is urged against the spring 113 by means of a rocking arm 117 which is journaled to the guide 109 as shown at 118. The arm 117 carries at its end a roller 119 adapted to coact with a cam 120 secured to the shaft 31. The blocks 110 and 111 carry jaws 121 which are identical in structure and suitably secured to their respective blocks as shown. The faces of the jaws 121 are adapted to engage the sides of the mandrel 68 to form the crimp of the hair pin as shown in Fig. 12 and to bend the legs of the hair pin to the diverted positions shown in Fig. 14. The crimping of the legs is done when the length of wire is on the mandrel 68 at the position shown by section line 12—12 and the legs of the pin are diverted as shown in Fig. 14 when the given length of wire is on the mandrel at the position indicated by the section line 14—14. It is to be understood therefore that the faces of the jaws 121 conform to the sides of the mandrel as is apparent.

While I have hereinbefore shown and described only generally the wire bending element 95 and the jaws 121 I wish it understood that the specific form of wire bending element as shown at 122 has been found to produce the best results in actual practice as a means for bending the length of wire to the position shown in Fig. 10. The wire bending element 122 comprises a base 123 which is adapted to be secured to the vertically movable block 93 in the same position as the element 95 hereinbefore described. The base 123 is provided with an opening 123' corresponding to the opening 95' of the wire bending element 95 through which the lower end of the arm 69 is adapted to operate as and for the purpose hereinbefore described. The base 123 is provided with a pair of wire gripping elements 124 which are pivotally connected thereto as shown at 125 and limited in their movement by means of lugs 126 operating within openings 127. The wings 124 are adapted to engage the length of wire subsequent to its being bent to a U-shape for the purpose of moving it successively to the second and third positions upon the mandrel 68 as hereinbefore described.

It is to be further understood that the specific form of the jaws 128, shown in Fig. 19, has been found in actual practice to produce the best results when crimping the legs of the length of wire subsequent to its having been bent to a U-shape. The jaws 128 are adapted to be connected to the block 110 and 111 in the same position as the jaws 121 hereinbefore described. The jaws 128 are provided with faces 129 having grooves 130 provided thereon, which grooves conform to the face of the mandrel 68 and serve in a coöperative manner with the mandrel 68 to crimp the legs of the length of wire as shown in Fig. 12.

In use, the wire 39 supplied from a suitable source, not shown, is threaded through the wire gripping element 38 of the wire feeding mechanism which is indicated as a whole by the numeral 36. The wire is further threaded through the opening 52 of the guide 51 and into the wire guiding element 60, the end of the wire being flush with the edge of the cutting element 65. When power is applied and the shafts 22 and 31 rotated the lug 43 is moved into engagement with the wing 42, whereupon the wire is gripped by the wire gripping element 38 of the wire feeding mechanism which is indicated as a whole by the numeral 36. The feeding mechanism 36 is then moved forward through the instrumentality of the pitman 35 and its various coöperating elements carrying forward the wire a predetermined distance, which distance is governed or predetermined by the throw of the pitman 35. When the wire has been fed forward a distance equal to the stroke of the pitman 35 the lug 44 through the instrumentality of the arm 47 is moved into engagement with the wing 42 whereupon the wire gripping element 38 is released from the wire. Immediately prior to the release of the wire gripping element 38 from the wire the plunger 53 is moved into engagement with the wire through the instrumentality of the arm 56 which is actuated by the cam 58. Immediately subsequent to the release of the wire gripping element the wire feeding mechanism 36 is moved freely through the instrumentality of pitman 35 to its original position. Immediately subsequent to the engagement of the plunger 53 with the wire the lower end of the arm 69 is moved into engagement with the wire in order to hold the same firmly in engagement with the mandrel 68. Upon the engagement of the lower end of the arm 69 with the wire the cutting element 65 is actuated through the instrumentality of the cam 64 to shear or cut the wire to a predetermined length. Immediately subsequent to the cutting of the wire the wire bending element 95 is moved through the instrumentality of the longitudinally movable block 89 into engagement with the predetermined length of wire in order to bend it around the mandrel 68 to the position shown in Fig. 10, the block 89 being moved forward due to the engagement of the roller 91 with the eccentric groove 92. After the wire is bent to the position shown in Figs. 10 and 11 and while the wire bending element 95 is in the position shown in Fig. 11 the wire bending element 95 together with the length of wire in the form shown in Fig. 10 is moved from the position shown in Fig. 11 to the line 12—12 of Fig. 13, through the instrumentality of the vertically movable block 93 which is moved downwardly by the arms 101 and 104 which are actuated together with the several coöperation elements due to the engagement of the roller 105 with the eccentric groove 106. When the length of wire has been moved to line 12—12 of Fig. 13 the jaws 121 are moved into engagement with the mandrel 68 through the instrumentality of cams 116 and 120 to crimp the legs of the hair pin as shown in Fig. 12. When the jaws 121 are brought into engagement with the mandrel 68 the wire bending element 95 is moved away from and out of engagement with the wire and immediately upon the disengagement of the wire bending element 95 with the wire it is moved upwardly to its original position. During the engagement of the jaws 121 with the wire in the position shown in Fig. 12, the upsetting elements 80 are moved into engagement with the ends of the wire to upset the same and form the balls thereon as shown, the upsetting elements being moved forward against the influence or tension of the spring 23 through the instrumentality of the oscillating lever 84 which is actuated by the cam 85. With the several elements in the positions described a second length of wire is moved forward by the feeding mechanism 36 and clamped by the plunger 53 as hereinbefore described. The predetermined length of wire is then retained in engagement with the mandrel 68 by the arm 69 and cut off by the cutting element 65 as hereinbefore described. The wire bending element 95 is then moved forward into engagement with the second predetermined length of wire which is bent as hereinbefore described to the position shown in Fig. 11. During the bending of the second length of wire to the position shown in Fig. 10 the transferring element 96 is brought into engagement with the previously predetermined length of wire which has been bent to the shape shown in Fig. 12 and previously moved to the position shown in Fig. 13. Immediately upon the engagement of the transferring element 96 with the predetermined length of wire which has previously been bent to the shape shown in Fig. 12 jaws 121 are disengaged from the mandrel 68 and immediately upon the disengagement of the jaws 121 the wire bending element 95 and the transferring element 96 are moved downwardly as hereinbefore described, carrying the first length of wire to the position on the mandrel 68 indicated by the line 14—14. As the first length of wire is moved to the position on the mandrel indicated by the line 14—14 the second length of wire is moved from the position shown in Fig. 11 to the position indicated by the line 12—12. When the wires have been moved to the last named positions the jaws 121 are again brought into engagement with the mandrel 68 as hereinbefore described in which instance the first length of wire is bent to the shape shown in Fig. 14 and the second length of wire is bent to the shape shown in Fig. 12. While the jaws 121 are in engagement with the mandrel 68 the upsetting elements 80 are moved forward as hereinbefore described to upset the ends of the second length of wire to form the balls thereon as shown in Fig. 12. The operations are continued and as the third length of wire which has been bent to the shape shown in Fig. 10 moves into the position on the mandrel 68 indicated by the line 12—12 the finished article formed from the first length of wire is released from the mandrel 68, the finished article being allowed to drop into a suitable container not shown, which may be placed directly beneath the opening 66.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, what

I claim as new and desire to secure and protect by Letters Patent of the United States, is:

1. A hair pin making machine comprising means for feeding a strand of wire along a given path, means for cutting the strand of wire into predetermined lengths, means for bending a predetermined length of wire into a U-shaped form, means for crimping the legs of the U-shaped piece of wire subsequent to its being bent to a U-shape, means for upsetting the ends of the U-shaped piece of wire subsequent to the crimping thereof, and means for diverting the legs of the U-shaped piece of wire subsequent to the upsetting of the ends thereof.

2. A hair pin making machine comprising means for feeding a strand of wire along a given path, means for cutting the strand of wire into predetermined lengths, a mandrel, means for holding the wire in contact with the mandrel during the cutting operation, means for bending a predetermined length of wire to a U-shape subsequent to the cutting operation, means for moving the U-shaped piece of wire to a second position on said mandrel, and means for crimping the legs of the U-shaped piece of wire subsequent to its being moved to its second position on said mandrel.

3. A hair pin making machine comprising means for feeding a strand of wire along a given path, means for cutting the strand of wire into predetermined lengths, a mandrel, means for holding the wire in contact with the mandrel during the cutting operation, means for bending a predetermined length of wire to a U-shape subsequent to the cutting operation, means for moving the U-shaped piece of wire to a second position on said mandrel, means for crimping the legs of the U-shaped piece of wire subsequent to its being moved to its second position on said mandrel, means for moving the U-shaped piece of wire subsequent to its being crimped to a third position on said mandrel, and means for diverting the legs of said U-shaped piece of wire upon its being moved to a third position on said mandrel.

4. A machine for making hair pins comprising means for intermittently feeding a strand of wire along a given course, means for cutting the strands of wire into predetermined length, means for intermittently gripping the wire immediately subsequent to its being cut into lengths, a mandrel, means for bending a predetermined length of wire to a U-shape about said mandrel, means for moving the U-shaped piece of wire to a second position on said mandrel, means for crimping the legs of said U-shaped piece of wire when in its second position upon said mandrel, the latter named means including intermittently actuated horizontally movable jaws, means for upsetting the ends of the U-shaped piece of wire when in its second position, means for moving the U-shaped piece of wire to a third position upon said mandrel, and means for diverting the ends of said U-shaped piece of wire when in its third position upon said mandrel.

5. A machine for making hair pins comprising intermittently actuated means for feeding a strand of wire along a given path, intermittently actuated means for cutting the strand of wire into predetermined lengths, a mandrel, means for holding a predetermined length of wire in engagement with said mandrel, means for bending the predetermined length of wire to a U-shape while it is being held in engagement with said mandrel, said means including a horizontally movable intermittently actuated block, means for moving said U-shaped piece of wire to a second position upon said mandrel, said means comprising a vertically movable intermittently actuated block, means for crimping the legs of said U-shaped piece of wire when in its second position upon said mandrel, and means for upsetting the ends of said U-shaped piece of wire when it is in its second position upon said mandrel.

6. A machine for making hair pins comprising intermittently actuated means for feeding a strand of wire along a given path, intermittently actuated means for cutting the strand of wire into predetermined lengths, a mandrel, means for holding a predetermined length of wire in engagement with said mandrel, means for bending the predetermined length of wire to a U-shape while it is being held in engagement with said mandrel, said means including a horizontally movable intermittently actuated block, means for moving said U-shaped piece of wire to a second position upon said mandrel, said means comprising a vertically movable intermittently actuated block, means for crimping the legs of said U-shaped piece of wire when in its second position upon said mandrel, means for upsetting the ends of said U-shaped piece of wire when it is in its second position upon said mandrel, means for moving said U-shaped piece of wire to a third position upon said mandrel, and means for diverting the ends of said U-shaped piece of wire when it is in its third position upon said mandrel.

7. A machine for making hair pins comprising intermittently actuated means for feeding a strand of wire along a given path, intermittently actuated means for cutting the strand of wire into predetermined lengths, a mandrel, means for holding a predetermined length of wire in engagement with said mandrel, means for bending the predetermined length of wire to a U-shape while it is being held in engagement with said mandrel, said means including a horizontally movable intermittently actuated block, means for moving said U-shaped piece of wire to a second position upon said mandrel, said means comprising a vertically movable intermittently actuated block, means for crimping the legs of said U-shaped piece of wire when in its second position upon said mandrel, means for upsetting the ends of said U-shaped piece of wire when it is in its second position upon said mandrel, means for moving said U-shaped piece of wire to a third position upon said mandrel, means for diverting the ends of said U-shaped piece of wire when it is in its third position upon said mandrel, and means for varying the lengths of the predetermined lengths of wire.

8. A hair pin making machine comprising means for feeding a strand of wire along a given path, means for cutting the strand of wire into predetermined lengths, a mandrel, intermittently actuated means for clamping the predetermined length of wire in engagement with said mandrel, thereby retaining the same momentarily in a given position subsequent to the cutting operation, means for bending a predetermined length of wire into a U-shaped form about said mandrel, means for moving the U-shaped form to a second position on said mandrel, means for upsetting the ends of the U-shaped piece of wire while it is in its second position, means for diverting the legs of the U-shaped piece of wire, and means for varying the length of the predetermined lengths of wire.

9. A hair pin making machine comprising means for feeding a strand of wire along a given path, means for cutting the strand of wire into predetermined lengths, a mandrel, means for holding the wire in contact with the mandrel during the cutting operation, the last named means comprising an intermittently reciprocated plunger, means for urging the plunger into engagement with the wire, and spring tension means for returning the plunger to its normal position, means for bending a predetermined length of wire to a U-shape subsequent to the cutting operation, means for moving the U-shaped piece of wire to a second position on said mandrel, means for crimping the legs of the U-shaped piece of wire subsequent to its being moved to its second position on said mandrel, means for upsetting the end of the U-shaped piece of wire when it is in its second position on said mandrel, means for moving the U-shaped piece of wire subsequent to its being crimped to a third position on said mandrel, and means for diverting the legs of said U-shaped piece of wire upon its being moved to a third position on said mandrel.

10. A machine for making hair pins comprising intermittently actuated means for feeding a strand of wire along a given path, intermittently actuated means for cutting the strand of wire into predetermined lengths, a mandrel, means for holding a predetermined length of wire in engagement with said mandrel, means for bending the predetermined length of wire to a U-shape while it is being held in engagement with said mandrel, said means including a horizontally movable intermittently actuated block, means for moving said U-shaped piece of wire to a second position upon said mandrel, said means comprising a vertically movable intermittently actuated block, carried by said horizontally movable intermittently actuated block, means for crimping the legs of said U-shaped piece of wire when in its second position upon said mandrel.

11. A hair pin making machine comprising a reciprocating element, gripping means carried by said reciprocating element for gripping a strand of wire whereby it is fed along a given path for a predetermined distance during the movement of said reciprocating element in a given direction, means for releasing said gripping means upon the reverse movement of said reciprocating element, a second means for gripping the strand of wire at the beginning of the return movement of said reciprocating element for holding the strand of wire during the return movement of said reciprocating element, means for cutting the strand of wire into predetermined lengths, means for bending a predetermined length of wire into a U-shaped form, means for crimping the legs of the U-shaped piece of wire subsequent to its being bent to a U-shape, means for upsetting the ends of the U-shaped piece of wire subsequent to the crimping thereof, and means for diverting the legs of the U-shaped piece of wire subsequent to the upsetting of the ends thereof.

ARTHUR J. LEWIS.